(12) United States Patent
Yang et al.

(10) Patent No.: US 8,623,515 B2
(45) Date of Patent: Jan. 7, 2014

(54) LIQUID CRYSTAL ALIGNMENT AGENT, LIQUID CRYSTAL ALIGNMENT FILM MANUFACTURED USING THE SAME, AND LIQUID CRYSTAL DISPLAY DEVICE INCLUDING THE LIQUID CRYSTAL ALIGNMENT FILM

(75) Inventors: Jae-Deuk Yang, Uiwang-si (KR); Eun-Ha Kim, Uiwang-si (KR); Myoung-Youp Shin, Uiwang-si (KR); Yong-Sik Yoo, Uiwang-si (KR); Guk-Pyo Jo, Uiwang-si (KR); Jung-Gon Choi, Uiwang-si (KR)

(73) Assignee: Cheil Industries Inc., Gumi-si (KR)

( * ) Notice: Subject to any disclaimer, the term of this patent is extended or adjusted under 35 U.S.C. 154(b) by 0 days.

(21) Appl. No.: 13/238,569

(22) Filed: Sep. 21, 2011

(65) Prior Publication Data

US 2012/0172540 A1 Jul. 5, 2012

(30) Foreign Application Priority Data

Dec. 29, 2010 (KR) .......................... 10-2010-0137874
Jun. 29, 2011 (KR) .......................... 10-2011-0063963

(51) Int. Cl.
*C08G 69/08* (2006.01)
*C07C 229/42* (2006.01)

(52) U.S. Cl.
USPC ................ 428/473.5; 252/299.4; 349/123; 349/127; 428/1.26; 428/474.4; 525/420; 525/432; 525/436; 528/350; 528/353

(58) Field of Classification Search
USPC ............. 525/420, 432, 436; 528/350, 353; 428/1.26, 473.5, 474.4; 252/299.4; 349/123, 127
See application file for complete search history.

(56) References Cited

U.S. PATENT DOCUMENTS

| | | | |
|---|---|---|---|
| 3,574,160 A | 4/1971 | Hsu et al. |
| 4,985,529 A | 1/1991 | Saito et al. |
| 5,756,649 A | 5/1998 | Mizushima |
| 6,307,002 B1 | 10/2001 | Okada et al. |
| 6,887,534 B2 | 5/2005 | Nakata et al. |
| 7,303,792 B2 | 12/2007 | Hosaka et al. |
| 7,901,745 B2 | 3/2011 | Oh et al. |
| 8,057,700 B2 | 11/2011 | Oh et al. |
| 8,173,749 B2 | 5/2012 | Bachels et al. |
| 2001/0046570 A1 | 11/2001 | Gibbons et al. |
| 2004/0009310 A1 | 1/2004 | Nakata et al. |
| 2006/0142538 A1 | 6/2006 | Tsutsui et al. |
| 2007/0036915 A1 | 2/2007 | Kurosaki et al. |
| 2007/0093640 A1 | 4/2007 | Kim et al. |
| 2007/0128378 A1 | 6/2007 | Kim et al. |
| 2008/0293888 A1* | 11/2008 | Bachels et al. ............... 525/200 |
| 2009/0146105 A1 | 6/2009 | Oh et al. |
| 2009/0299014 A1 | 12/2009 | Oh et al. |
| 2010/0047482 A1 | 2/2010 | Kim et al. |
| 2010/0048849 A1 | 2/2010 | Eckert et al. |
| 2010/0085523 A1 | 4/2010 | Terashita et al. |
| 2011/0065859 A1 | 3/2011 | Bury et al. |
| 2011/0144299 A1 | 6/2011 | Yang et al. |
| 2012/0013837 A1 | 1/2012 | Terashita et al. |
| 2012/0172540 A1 | 7/2012 | Yang et al. |

FOREIGN PATENT DOCUMENTS

| | | |
|---|---|---|
| CN | 101346342 A | 1/2009 |
| CN | 102102019 | 6/2011 |
| EP | 1801097 A1 | 6/2007 |
| JP | 59-145216 | 8/1984 |
| JP | 61-059334 | 3/1986 |
| JP | 2743460 A | 11/1990 |
| JP | 08-208983 | 8/1996 |
| JP | 09-080440 | 3/1997 |
| JP | 3322089 A | 3/1997 |
| JP | 09-272740 | 10/1997 |
| JP | 10183120 A | 7/1998 |

(Continued)

OTHER PUBLICATIONS

Chinese Office Action in commonly owned Chinese Application No. 201010251042.4 dated Nov. 5, 2012, pp. 1-7.
USPTO structure search, Aug. 2012, pp. 1-2.
Office Action in commonly owned U.S. Appl. No. 12/873,420, mailed Aug. 29, 2012, pp. 1-8.
International Search Report in commonly owned International Application No. PCT/KR2007/006898, mailed Feb. 18, 2008.
Office Action in commonly owned U.S. Appl. No. 12/873,420 mailed Aug. 29, 2012, pp. 1-9.
Office Action in commonly owned U.S. Appl. No. 12/329,139 mailed Jan. 20, 2011, pp. 1-4.

(Continued)

*Primary Examiner* — Ana Woodward
(74) *Attorney, Agent, or Firm* — Additon, Higgins, Pendleton & Ashe, P.A.

(57) ABSTRACT

Disclosed is a liquid crystal alignment agent that includes a polymer including polyamic acid including a repeating unit represented by the following Chemical Formula 1, polyimide including a repeating unit represented by the following Chemical Formula 2, or a combination thereof.

[Chemical Formula 1]

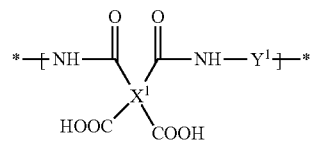

[Chemical Formula 2]

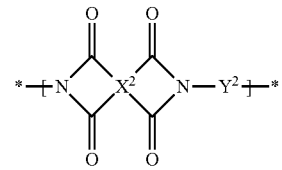

In Chemical Formulae 1 and 2, $X^1$, $X^2$, $Y^1$ and $Y^2$ are the same as defined in the detailed description.

10 Claims, No Drawings

(56) References Cited

FOREIGN PATENT DOCUMENTS

| | | |
|---|---|---|
| JP | 2004-020658 | 1/2004 |
| JP | 2004-067589 | 3/2004 |
| JP | 2004-170718 A | 6/2004 |
| JP | 2005-037920 | 2/2005 |
| JP | 2006-089492 | 4/2006 |
| JP | 2004-047762 A | 2/2007 |
| JP | 2007-047762 A | 2/2007 |
| JP | 2008-203641 A | 9/2008 |
| JP | 2008-262170 A | 10/2008 |
| JP | 2009-037104 | 2/2009 |
| KR | 10-1998-0059346 | 10/1998 |
| KR | 100213178 B1 | 5/1999 |
| KR | 1020000035320 A | 6/2000 |
| KR | 1020020068695 A | 8/2002 |
| KR | 10-2003-0088503 A | 11/2003 |
| KR | 10-2004-0050166 A | 6/2004 |
| KR | 1020040083610 A | 10/2004 |
| KR | 1020050065051 A | 6/2005 |
| KR | 10-2005-0084995 A | 8/2005 |
| KR | 10-2005-0106423 A | 11/2005 |
| KR | 2006-0115682 A | 11/2006 |
| KR | 10-2006-0123178 A | 12/2006 |
| KR | 1020070057658 A | 6/2007 |
| KR | 10-2007-0071997 A | 7/2007 |
| KR | 10-083778 B1 | 6/2008 |
| KR | 10-2008-0080663 A | 9/2008 |
| KR | 10-2008-0081846 A | 9/2008 |
| KR | 10-2009-0008730 A | 1/2009 |
| KR | 10-2009-0056926 A | 6/2009 |
| KR | 10-2009-0059989 A | 6/2009 |
| KR | 10-2009-0060000 A | 6/2009 |
| KR | 10-2009-0061567 A | 6/2009 |
| KR | 10-2009-0066077 A | 6/2009 |
| KR | 10-2009-0068077 A | 6/2009 |
| KR | 10-2009-0091664 A | 8/2009 |
| KR | 10-0913605 A | 8/2009 |
| KR | 10-2009-0102698 A | 9/2009 |
| KR | 10-2009-0103871 A | 10/2009 |
| KR | 10-2009-0115072 A | 11/2009 |
| KR | 10-2010-0017575 A | 2/2010 |
| KR | 10-2010-0021491 A | 2/2010 |
| KR | 10-2010-0023122 A | 3/2010 |
| KR | 10-2010-0057086 A | 5/2010 |
| KR | 2010-0112073 A | 10/2010 |
| KR | 10-2011-0072173 A | 6/2011 |
| KR | 2011-0072176 A | 6/2011 |
| KR | 2011-0082589 A | 7/2011 |
| KR | 2011-0096094 A | 8/2011 |
| KR | 2011-0109839 A | 10/2011 |
| TW | 200906911 | 2/2009 |
| WO | 2007071091 A1 | 6/2007 |
| WO | 2008/119449 A1 | 10/2008 |
| WO | 2008/126978 A1 | 10/2008 |
| WO | 2008/135131 A1 | 11/2008 |
| WO | 2008/153286 A2 | 12/2008 |
| WO | 2010/079637 A1 | 7/2010 |

OTHER PUBLICATIONS

Notice of Allowance in commonly owned U.S. Appl. No. 12/329,139 mailed Sep. 14, 2011, pp. 1-5.
Notice of Allowance in commonly owned U.S. Appl. No. 12/476,465 mailed Oct. 28, 2010, pp. 1-15.
USPTO structure search, Jan. 2013.
Notice of Allowance in commonly owned U.S. Appl. No. 13/238,450 mailed on Feb. 28, 2013, pp. 1-8.
Notice of Allowance in commonly owned U.S. Appl. No. 12/873,420 mailed on Mar. 18, 2013, pp. 1-6.
Pattanaargson et al., Photoisomerization of octyl methoxycinnamete, J. Photochem and Photobio, Chem. 161, pp. 269-274 (2004).
Office Action in commonly owned U.S. Appl. No. 13/353,559 mailed May 8, 2013, pp. 1-8.
European Search Report in counterpart European Application No. 11174615.2 dated Apr. 16, 2013, pp. 1-7.
Chinese Search Report issued in counterpart Chinese Application No. 201110189948.2 dated Sep. 3, 2013, pp. 1-3.

* cited by examiner

LIQUID CRYSTAL ALIGNMENT AGENT, LIQUID CRYSTAL ALIGNMENT FILM MANUFACTURED USING THE SAME, AND LIQUID CRYSTAL DISPLAY DEVICE INCLUDING THE LIQUID CRYSTAL ALIGNMENT FILM

CROSS-REFERENCE TO RELATED APPLICATION

This application claims priority under 35 USC Section 119 to and the benefit of Korean Patent Application No. 10-2010-0137874 filed on Dec. 29, 2010 and Korean Patent Application No. 10-2011-0063963 filed on Jun. 29, 2011 in the Korean Intellectual Property Office, the entire disclosures of which are incorporated herein by reference.

FIELD OF THE INVENTION

The present invention relates to a liquid crystal alignment agent, a liquid crystal alignment film manufactured using the same, and a liquid crystal display including the liquid crystal alignment film.

BACKGROUND OF THE INVENTION

A liquid crystal display (LCD) includes a liquid crystal alignment film, and the liquid crystal alignment film is mainly made of polymer materials. The liquid crystal alignment film plays a role of a director in aligning liquid crystal molecules. When the liquid crystal molecules are moved by the influence of an electric field to display an image, the liquid crystal alignment film allows the liquid crystal molecules to be oriented in a predetermined direction. Generally, it is necessary to uniformly align the liquid crystal molecules in order to provide uniform brightness and a high contrast ratio to the LCD.

There is an increased demand for high quality LCDs. In addition, since LCDs are rapidly becoming larger, there is an increasing requirement for a highly productive liquid crystal alignment film. Accordingly, there is a need for a liquid crystal alignment film having a low defect rate in the LCD manufacturing process, excellent electro-optical characteristics, high reliability, and high performance that widely satisfies different characteristics for variously-developing LCDs.

SUMMARY OF THE INVENTION

One embodiment of the present invention provides a liquid crystal alignment agent that can increase the stability of an alignment layer by increasing the light response rate and can minimize the influence of residual compounds with a double bond.

Another embodiment of the present invention provides a liquid crystal alignment film manufactured using the liquid crystal alignment agent.

Yet another embodiment of the present invention provides a liquid crystal display including the liquid crystal alignment film.

According to one embodiment of the present invention, a liquid crystal alignment agent is provided that includes a polymer comprising polyamic acid including a repeating unit represented by the following Chemical Formula 1, polyimide including a repeating unit represented by the following Chemical Formula 2, or a combination thereof.

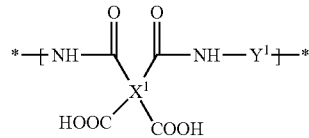

[Chemical Formula 1]

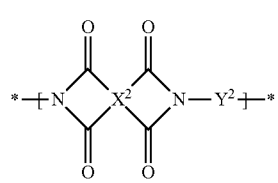

[Chemical Formula 2]

In Chemical Formulae 1 and 2, $X^1$ and $X^2$ are the same or different and are each independently a tetravalent organic group derived from alicyclic acid dianhydride or aromatic acid dianhydride, and $Y^1$ and $Y^2$ are the same or different and are each independently a divalent organic group derived from diamine, wherein the diamine includes a diamine represented by the following Chemical Formula 3.

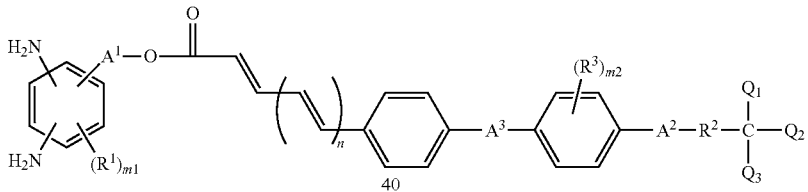

[Chemical Formula 3]

In Chemical Formula 3, $A^1$ is substituted or unsubstituted C1 to C20 alkylene, $A^2$ is a single bond, O, $SO_2$, or $C(R_{103})(R_{104})$, wherein $R_{103}$ and $R_{104}$ are the same or different and are independently hydrogen or substituted or unsubstituted C1 to C6 alkylene, $A^3$ is —O—, —OCO—, —COO—, —CONH—, or —NHCO—, each $R^1$ is the same or different and is independently substituted or unsubstituted C1 to C30 alkyl; substituted or unsubstituted C6 to C30 aryl; or substituted or unsubstituted C2 to C30 heteroaryl, $R^2$ is substituted or unsubstituted C1 to C30 alkylene, C1 to C30 alkylene wherein at least one —$CH_2$— group thereof is substituted with —CO—, —CO—O—, —NZ—, —NZ—CO—, —CO—NZ— or —CH=CH—, wherein Z is hydrogen or C1 to C10 alkyl, provided that oxygen atoms are not directly bound to each other, each $R^3$ is the same or different and is independently substituted or unsubstituted C1 to C30 alkyl; substituted or unsubstituted C6 to, C30 aryl; or substituted or unsubstituted C2 to C30 heteroaryl, $Q_1$, $Q_2$ and $Q_3$ are the same or different and are independently hydrogen or halogen, n is an integer ranging from 0 to 3, m1 is an integer ranging from 0 to 3, and m2 is an integer ranging from 0 to 4.

The diamine may include at least one diamine represented by the following Chemical Formula 4, at least one diamine represented by the following Chemical Formula 5, or a combination thereof.

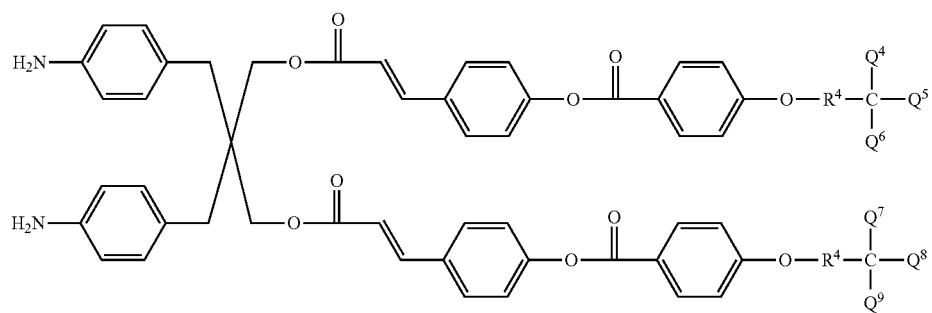

In Chemical Formula 4, each $R^4$ is the same or different and is independently substituted or unsubstituted C1 to C30 alkylene, C1 to C30 alkylene wherein at least one —$CH_2$—group thereof is substituted with —CO—, —CO—O—, —NZ—, —NZ—CO—, —CO—NZ— or —CH=CH—, wherein Z is hydrogen or C1 to C10 alkyl, provided that oxygen atoms are not directly bound to each other, and $Q^4$, $Q^5$, $Q^6$, $Q^7$, $Q^8$ and $Q^9$ are the same or different and are independently hydrogen or halogen,

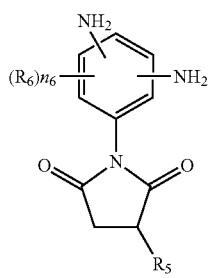

[Chemical Formula 5]

In Chemical Formula 5, $R_5$ is hydrogen; substituted or unsubstituted C1 to C30 alkyl; substituted or unsubstituted C6 to C30 aryl; or substituted or unsubstituted C2 to C30 heteroaryl, each $R_6$ is the same or different and is independently substituted or unsubstituted C1 to C30 alkyl; substituted or unsubstituted C6 to C30 aryl; or substituted or unsubstituted C2 to C30 heteroaryl, and n6 is an integer ranging from 0 to 3.

The diamine may include about 30 mol % to about 90 mol % of the diamine represented by the above Chemical Formula 3, about 5 mol % to about 20 mol % of the diamine represented by the above Chemical Formula 4, and about 5 mol % to about 50 mol % of the diamine represented by the above Chemical Formula 5, based on the total amount of diamine.

The diamine represented by the above Chemical Formula 3 may include for example, the diamine represented by the following Chemical Formula 6.

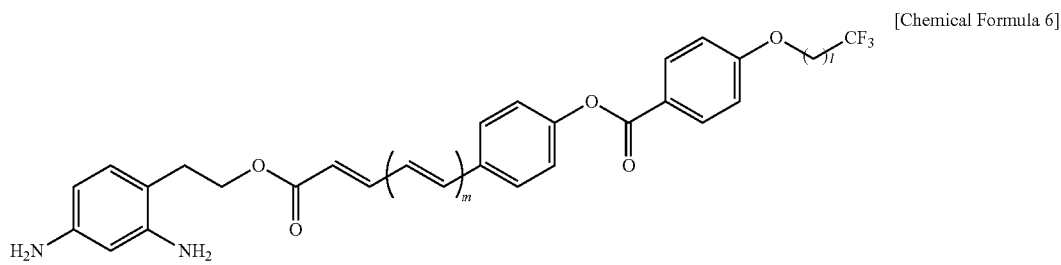

[Chemical Formula 6]

In Chemical Formula 6, l is an integer ranging from 0 to 10, and m is an integer ranging from 0 to 3.

The polyamic acid and the polyimide each may have a weight average molecular weight of about 10,000 to about 300,000.

The liquid crystal alignment agent may include the polyamic acid and the polyimide at a weight ratio of about 1:99 to about 50:50.

The liquid crystal alignment agent may include about 1 wt % to about 30 wt % of a solid.

The liquid crystal alignment agent may have a viscosity of about 3 cps to about 30 cps.

According to another embodiment of the present invention, a liquid crystal alignment film manufactured by applying the liquid crystal alignment agent to a substrate is provided.

According to yet another embodiment of the present invention, a liquid crystal display including the liquid crystal alignment film is provided.

The liquid crystal alignment agent can increase the stability of the alignment layer and can minimize the influence of any residue remaining therein having a double bond.

DETAILED DESCRIPTION

The present invention will be described more fully hereinafter in the following detailed description of the invention, in which some but not all embodiments of the invention are described. Indeed, this invention may be embodied in many different forms and should not be construed as limited to the embodiments set forth herein; rather, these embodiments are provided so that this disclosure will satisfy applicable legal requirements.

As used herein, when a specific definition is not otherwise provided, the term "substituted" may refer to one substituted with a substituent comprising halogen (F, Br, Cl or I), hydroxy, nitro, cyano, amino ($NH_2$, $NH(R^{100})$ or $N(R^{101})(R^{102})$, wherein $R^{100}$, $R^{101}$, and $R^{102}$ are the same or different and are each independently C1 to C10 alkyl), amidino, hydrazine, hydrazone, carboxyl, substituted or unsubstituted alkyl, substituted or unsubstituted haloalkyl, substituted or unsubstituted alkoxy, substituted or unsubstituted alicyclic organic, substituted or unsubstituted aryl, substituted or unsubstituted alkenyl, substituted or unsubstituted alkynyl, substituted or unsubstituted heteroaryl, substituted or unsubstituted heterocycloalkyl, or a combination thereof, in place of at least one of hydrogen of a functional group.

As used herein, when a specific definition is not otherwise provided, the term "alkyl" may refer to a C1 to C30 alkyl, for example C1 to C20 alkyl, the term "cycloalkyl" may refer to C3 to C30 cycloalkyl, for example C3 to C20 cycloalkyl, the term "heterocycloalkyl" may refer to C2 to C30 heterocycloalkyl, for example C2 to C20 heterocycloalkyl, the term "alkylene" may refer to C1 to C30 alkylene, for example C1 to C20 alkylene, the term "alkoxy" may refer to C1 to C30 alkoxy, for example C1 to C20 alkoxy, the term "cycloalkylene" may refer to C3 to C30 cycloalkylene, for example C3 to C20 cycloalkylene, the term "heterocycloalkylene" may refer to C2 to C30 heterocycloalkylene, for example C2 to C20 heterocycloalkylene, the term "aryl" may refer to C6 to C30 aryl, for example C6 to C20 aryl, the term "heteroaryl" may refer to C2 to C30 heteroaryl, for example C2 to C18 heteroaryl, the term "arylene" may refer to C6 to C30 arylene, for example C6 to C20 arylene, the term "heteroarylene" may refer to C2 to C30 heteroarylene, for example C2 to C20 heteroarylene, the term "alkylaryl" may refer to C7 to C30 alkylaryl, for example C7 to C20 alkylaryl, and the term "halogen" may refer to F, Cl, Br, or I.

As used herein, when a specific definition is not otherwise provided, the terms heterocycloalkyl, heterocycloalkylene, heteroaryl, and heteroarylene may refer to cycloalkyl, cycloalkylene, aryl, and arylene, respectively, including 1 to 3 heteroatoms including N, O, S, Si, P, or a combination thereof in place of one or more carbon ring atoms.

As used herein, when a specific definition is not otherwise provided, the term "aliphatic" may refer to C1 to C30 alkyl, C2 to C30 alkenyl, C2 to C30 alkynyl, C1 to C30 alkylene, C2 to C30 alkenylene, or C2 to C30 alkynylene, for example C1 to C20 alkyl, C2 to C20 alkenyl, C2 to C20 alkynyl, C1 to C20 alkylene, C2 to C20 alkenylene, or C2 to C20 alkynylene, the term "alicyclic" may refer to C3 to C30 cycloalkyl, C3 to C30 cycloalkenyl, C3 to C30 cycloalkynyl, C3 to C30 cycloalkylene, C3 to C30 cycloalkenylene, or C3 to C30 cycloalkynylene, for example C3 to C20 cycloalkyl, C3 to C20 cycloalkenyl, C3 to C20 cycloalkynyl, C3 to C20 cycloalkylene, C3 to C20 cycloalkenylene, or C3 to C20 cycloalkynylene, and the term "aromatic" may refer to C6 to C30 aryl, C2 to C30 heteroaryl, C6 to C30 arylene, or C2 to C30 heteroarylene, for example C6 to C16 aryl, C2 to C16 heteroaryl, C6 to C16 arylene, or C2 to C16 heteroarylene.

As used herein, when a specific definition is not otherwise provided, the term "combination" may refer to mixture or copolymerization; in case of an alicyclic organic group and an aromatic organic group, a fused ring of two or more rings, or two or more rings linked by a single bond, O, S, C(=O), CH(OH), S(=O), $S(=O)_2$, $Si(CH_3)_2$, $(CH_2)_p$ (wherein, $1 \leq p \leq 2$), $(CF_2)_q$ (wherein, $1 \leq q \leq 2$), $C(CH_3)_2$, $C(CF_3)_2$, $C(CH_3)(CF_3)$, or C(=O)NH. Herein, "copolymerization" may refer to block copolymerization or to random copolymerization, and "copolymer" may refer to a block copolymer or to a random copolymer.

"*" denotes a position linked to the same or different atom or Chemical Formula.

The liquid crystal alignment agent according to one embodiment of the present invention includes a polymer comprising polyamic acid including a repeating unit represented by the following Chemical Formula 1, polyimide including a repeating unit represented by the following Chemical Formula 2, or a combination thereof.

[Chemical Formula 1]

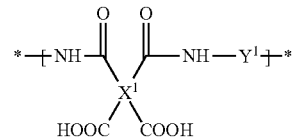

[Chemical Formula 2]

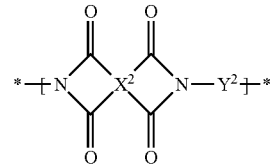

In Chemical Formulae 1 and 2, $X^1$ and $X^2$ are the same or different and are each independently a tetravalent organic group derived from alicyclic acid dianhydride or aromatic acid dianhydride. $X^1$ may be the same or different in each repeating unit, and $X^2$ may be the same or different in each repeating unit.

Exemplary alicyclic acid dianhydrides may include without limitation 1,2,3,4-cyclobutanetetracarboxylic acid dianhydride (CBDA), 5-(2,5-dioxotetrahydrofuryl)-3-methylcyclohexene-1,2-dicarboxylic acid anhydride (DOCDA), bicyclooctene-2,3,5,6-tetracarboxylic acid dianhydride (BODA), 1,2,3,4-cyclopentanetetracarboxylic acid dianhydride (CPDA), 1,2,4,5-cyclohexanetetracarboxylic acid dianhydride (CHDA), 1,2,4-tricarboxyl-3-methylcarboxyl cyclopentane dianhydride, 1,2,3,4-tetracarboxyl cyclopentane dianhydride, and the like, and combinations thereof.

The tetravalent organic group derived from the alicyclic acid dianhydride may include at least one of the functional groups represented by the following Chemical Formulae 11 to 15, but is not limited thereto.

[Chemial Formula 11]

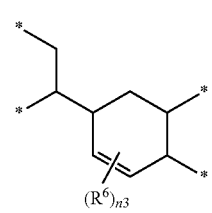

[Chemical Formula 12]

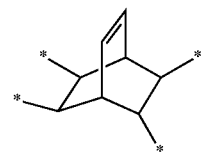

[Chemical Formula 13]

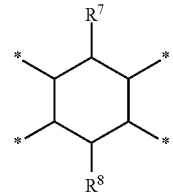

-continued

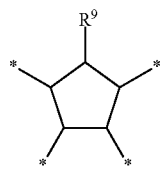
[Chemical Formula 14]

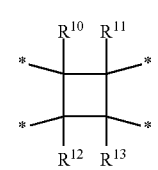
[Chemical Formula 15]

In Chemical Formulae 11 to 15, $R^6$ are the same or different and are independently substituted or unsubstituted C1 to C30 alkyl, substituted or unsubstituted C6 to C30 aryl, or substituted or unsubstituted C2 to C30 heteroaryl, $n_3$ is an integer ranging from 0 to 3, and $R^7$ to $R^{13}$ are the same or different and are independently hydrogen, substituted or unsubstituted C1 to C30 alkyl, substituted or unsubstituted C6 to C30 aryl, or substituted or unsubstituted C2 to C30 heteroaryl.

When $n_3$ is an integer of 2 or more, a plurality of $R^6$ may be the same or different.

In Chemical Formulae 16 and 17, $R^{14}$ and $R^{15}$ are the same or different and are each independently hydrogen, substituted or unsubstituted C1 to C30 alkyl, substituted or unsubstituted C6 to C30 aryl, or substituted or unsubstituted C2 to C30 heteroaryl, $R^{16}$ and $R^{17}$ are the same or different and are independently substituted or unsubstituted C1 to C30 alkyl, substituted or unsubstituted C6 to C30 aryl, or substituted or unsubstituted C2 to C30 heteroaryl, $n_4$ and $n_5$ are each independently integers ranging from 0 to 3, and $A^1$ is a single bond, O, CO, substituted or unsubstituted C1 to C6 alkylene (e.g., $C(CF_3)_2$), substituted or unsubstituted C3 to C30 cycloalkylene, or substituted or unsubstituted C2 to C30 heterocycloalkylene.

When $n_4$ is an integer of 2 or more, a plurality of $R^{16}$ may be the same or different. When $n_5$ is an integer of 2 or more, a plurality of $R^{17}$ may be the same or different.

$Y^1$ and $Y^2$ are the same or different and are each independently a divalent organic group derived from diamine, wherein the diamine includes a diamine represented by the following Chemical Formula 3. $Y^1$ may be the same or different in each repeating unit, and $Y^2$ may be the same or different in each repeating unit.

[Chemical Formula 3]

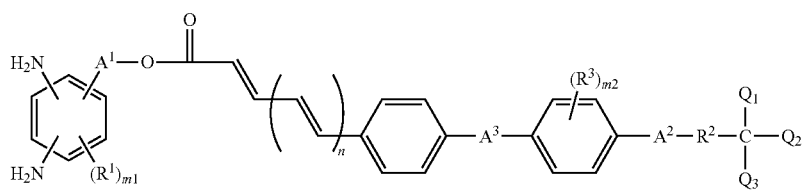

Exemplary aromatic acid dianhydrides may include without limitation pyromellitic acid dianhydride (PMDA), biphthalic acid dianhydride (BPDA), oxydiphthalic acid dianhydride (ODPA), benzophenonetetracarboxylic acid dianhydride (BTDA), hexafluoroisopropylidene diphthalic acid dianhydride (6-FDA), and the like, and combinations thereof.

The tetravalent organic group derived from the aromatic acid dianhydride may include at least one of a functional group represented by the following Chemical Formula 16 and a functional group represented by the following Chemical Formula 17, or a combination thereof, but is not limited thereto.

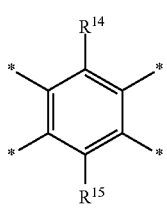
[Chemical Formula 16]

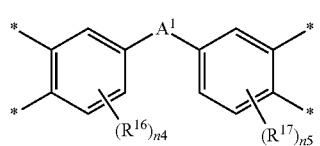
[Chemical Formula 17]

In Chemical Formula 3, $A^1$ is substituted or unsubstituted C1 to C20 alkylene, $A^2$ is a single bond, O, $SO_2$, or $C(R_{103})(R_{104})$, wherein $R_{103}$ and $R_{104}$ are the same or different and are independently hydrogen or substituted or unsubstituted C1 to C6 alkylene, $A^3$ is —O—, —COO—, —COO—, —CONH—, or —NHCO—, each $R^1$ is the same or different and is independently substituted or unsubstituted C1 to C30 alkyl; substituted or unsubstituted C6 to C30 aryl; or substituted or unsubstituted C2 to C30 heteroaryl, $R^2$ is substituted or unsubstituted C1 to C30 alkylene, C1 to C30 alkylene wherein at least one —$CH_2$— group thereof is substituted with —CO—, —CO—O—, —NZ—, —NZ—CO—, —CO—NZ— or —CH=CH—, wherein Z is hydrogen or C1 to C10 alkyl, provided that oxygen atoms are not directly bound to each other, each $R^3$ is the same or different and is independently substituted or unsubstituted C1 to C30 alkyl; substituted or unsubstituted C6 to C30 aryl; or substituted or unsubstituted C2 to C30 heteroaryl, $Q_1$, $Q_2$ and $Q_3$ are the same or different and are independently hydrogen or halogen, n is an integer ranging from 0 to 3, m1 is an integer ranging from 0 to 3, and m2 is an integer ranging from 0 to 4.

The diamine represented by Chemical Formula 3 may decrease the monomer amount by using a mono-type cinnamate structure. It may also increase the light reactivity by including two or more double bonds into the mono cinnamate to increase the reaction sites and ensure the alignment stability and processibility.

The diamine represented by the above Chemical Formula 3 may include for example, the diamine represented by the following Chemical Formula 6, but is not limited thereto.

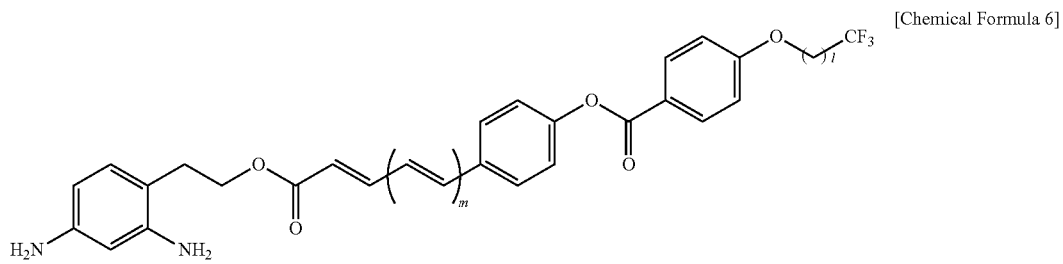

[Chemical Formula 6]

In Chemical Formula 6,
l is an integer ranging from 0 to 10, and
m is an integer ranging from 0 to 3.

The diamine may include the diamine represented by the above Chemical Formula 3 singularly, or as a mixture of the diamine represented by the above Chemical Formula 3 and the diamine represented by the above Chemical Formula 4 and/or the diamine represented by the above Chemical Formula 5.

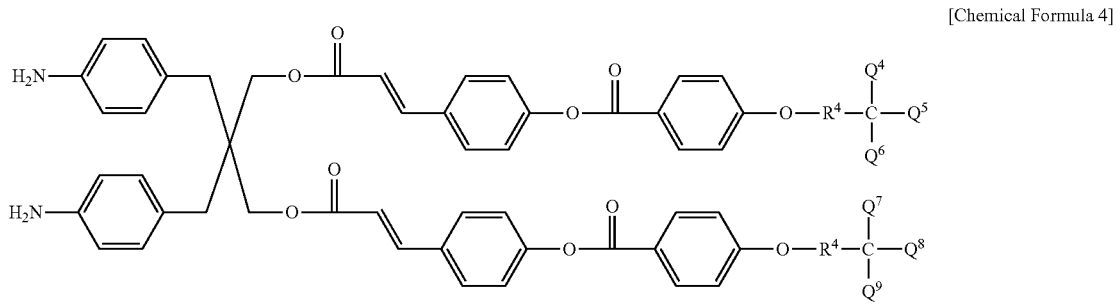

[Chemical Formula 4]

In Chemical Formula 4,
each $R^4$ is the same or different and is independently substituted or unsubstituted C1 to C30 alkylene, C1 to C30 alkylene wherein at least one —$CH_2$-group thereof is substituted with —CO—, —CO—O—, —NZ—, —NZ—CO—, —CO—NZ— or —CH=CH—, wherein Z is hydrogen or C1 to C10 alkyl, provided that oxygen atoms are not directly bound to each other, and
$Q^4, Q^5, Q^6, Q^7, Q^8$ and $Q^9$ are the same or different and are independently hydrogen or halogen.

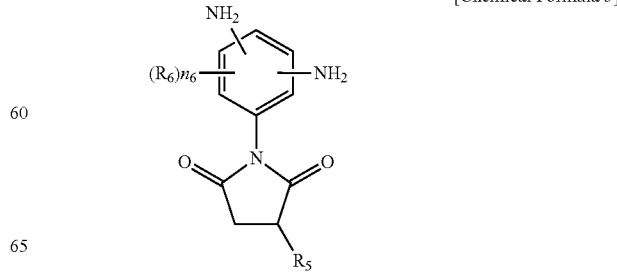

[Chemical Formula 5]

In Chemical Formula 5, $R_5$ is hydrogen; substituted or unsubstituted C1 to C30 alkyl; substituted or unsubstituted C6 to C30 aryl; or substituted or unsubstituted C2 to C30 heteroaryl, each $R_6$ is the same or different and is independently substituted or unsubstituted C1 to C30 alkyl; substituted or unsubstituted C6 to C30 aryl; or substituted or unsubstituted C2 to C30 heteroaryl, and n6 is an integer ranging from 0 to 3.

The diamines of Chemical Formula 3, Chemical Formula 4, and/or Chemical Formula 5 may be commercially available and/or may be synthesized by the skilled artisan without undue experimentation. Suitable starting materials for the synthesis of the diamines can also be commercially available and/or can be readily synthesized by the skilled artisan. The specification including the examples below illustrates non-limiting exemplary diamines of Chemical Formula 3, Chemical Formula 4, and/or Chemical Formula 5. The skilled artisan will understand and appreciate the types of, and how to make, the diamines of Chemical Formula 3, Chemical Formula 4, and/or Chemical Formula 5, including the selection of suitable starting materials and reaction conditions, without undue experimentation.

The polyamic acid including a repeating unit represented by Chemical Formula 1 may be synthesized from acid dianhydride and diamine. The method of preparing polyamic acid by copolymerizing the acid dianhydride and the diamine is not specifically limited as long as it synthesizes the polyamic acid.

The polyimide including a repeating unit represented by Chemical Formula 2 may be prepared by imidizing the polyamic acid including a repeating unit represented by Chemical Formula 1. Methods of preparing polyimide by imidizing polyamic acid are well known to the one of ordinary skill in this art, so the details are omitted.

When the diamine includes the diamine represented by the above Chemical Formula 4 and the diamine represented by the above Chemical Formula 5 as well as the diamine represented by the above Chemical Formula 3, the diamine may include about 30 mol % to about 90 mol % of the diamine represented by the above Chemical Formula 3, about 5 mol % to about 20 mol % of the diamine represented by the above Chemical Formula 4, and about 5 mol % to about 50 mol % of the diamine represented by the above Chemical Formula 5, based on the total amount of diamine.

In some embodiments, the diamine may include the diamine represented by Chemical Formula 3 in an amount of about 30, 31, 32, 33, 34, 35, 36, 37, 38, 39, 40, 41; 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, or 90 mol %. Further, according to some embodiments of the present invention, the amount of the diamine represented by Chemical Formula 3 can be in a range from about any of the foregoing amounts to about any other of the foregoing amounts.

In some embodiments, the diamine may include the diamine represented by Chemical Formula 4 in an amount of about 5, 6, 7, 8, 9, 10, 11, 12, 13, 14, 15, 16, 17, 18, 19, or 20 mol %. Further, according to some embodiments of the present invention, the amount of the diamine represented by Chemical Formula 4 can be in a range from about any of the foregoing amounts to about any other of the foregoing amounts.

In some embodiments, the diamine may include the diamine represented by Chemical Formula 5 in an amount of about 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50 mol %. Further, according to some embodiments of the present invention, the amount of the diamine represented by Chemical Formula 5 can be in a range from about any of the foregoing amounts to about any other of the foregoing amounts.

When the liquid crystal alignment agent includes each diamine in an amount within the above ranges, this may improve transmittance by controlling the pretilt angle, and this may also effectively improve liquid crystal alignment properties, chemical resistance, electro-optical characteristics, thermal stability, and mechanical characteristics.

The polyamic acid and the polyimide each may have a weight average molecular weight of about 10,000 to about 300,000. When the polyamic acid and polyimide have a weight average molecular weight within the above range, this may effectively improve the reliability and the electro-optical characteristics, provide excellent chemical resistance, and stably maintain the pretilt angle even after driving the liquid crystal display.

The liquid crystal alignment agent may include the polyamic acid and the polyimide at a weight ratio of about 1:99 to about 50:50, for example about 10:90 to about 50:50. In some embodiments, the combination of the polyamic acid and the polyimide may include the polyamic acid in an amount of about 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50 wt %. Further, according to some embodiments of the present invention, the amount of the polyamic acid can be in a range from about any of the foregoing amounts to about any other of the foregoing amounts.

In some embodiments, the combination of the polyamic acid and the polyimide may include the polyimide in an amount of about 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, or 99 wt %. Further, according to some embodiments of the present invention, the amount of the polyimide can be in a range from about any of the foregoing amounts to about any other of the foregoing amounts.

Including the polyamic acid and the polyimide in an amount within the above range may improve alignment stability.

The liquid crystal alignment agent may include the polymer in an amount of about 1 wt % to about 25 wt %, for example, about 3 wt % to about 20 wt %, based on the total weight of the liquid crystal alignment agent. In some embodiments, the liquid crystal alignment agent may include the polymer in an amount of about 1, 2, 3, 4, 5, 6, 7, 8, 9, 10, 11, 12, 13, 14, 15, 16, 17, 18, 19, 20, 21, 22, 23, 24, or 25 wt %. Further, according to some embodiments of the present invention, the amount of the polymer can be in a range from about any of the foregoing amounts to about any other of the foregoing amounts.

When the polymer is included in an amount within the above range, it may improve printability and liquid crystal alignment properties. The liquid crystal alignment agent according to one embodiment of the present invention may further include a suitable solvent to dissolve the polymer.

Examples of the solvent suitable for dissolving the polymer may include without limitation N-methyl-2-pyrrolidone; N,N-dimethyl acetamide; N,N-dimethyl formamide; dimethyl sulfoxide; γ-butyrolactone; tetrahydrofuran (THF); and phenol-based solvents such as meta cresol, phenol, halogenated phenols, and the like, and combinations thereof.

The solvent may further include 2-butyl cellosolve (2-BC) to improve printability. The 2-butyl cellosolve may be included in an amount of about 1 wt % to about 60 wt %, for example about 10 wt % to about 60 wt %, based on the total amount of solvent including 2-butyl cellosolve. When 2-butyl cellosolve is included in an amount within the above range, it may easily improve printability. In addition, the solvent may further include a poor solvent. Examples of poor solvents include without limitation alcohols, ketones, esters, ethers, hydrocarbons, halgenated hydrocarbons, and the like, and combinations thereof. The poor solvent can be present in an appropriate ratio as long as the soluble polyimide polymer is not precipitated. The poor solvents may decrease the surface energy of the liquid crystal alignment agent to improve the spreadability and flatness during the coating process.

The liquid crystal alignment agent can include the poor solvent in an amount of about 1 wt % to about 90 wt %, for example about 1 wt % to about 70 wt %, based on the total weight of solvent including poor solvent.

Examples of the poor solvent may include without limitation methanol, ethanol, isopropanol, cyclohexanol, ethylene glycol, propylene glycol, 1,4-butanediol, triethylene glycol, acetone, methylethylketone, cyclohexanone, methylacetate, ethylacetate, butylacetate, diethyloxalate, malonic acid ester, diethylether, ethylene glycol monomethylether, ethylene glycol dimethylether, ethylene glycol monoethylether, ethylene glycol phenylether, ethylene glycol phenylmethylether, ethylene glycol phenylethylether, diethylene glycol dimethylether, diethylene glycol ether, diethylene glycol monomethylether, diethyleneglycol monoethylether, diethylene glycol monomethylether acetate, diethylene glycol monoethylether acetate, ethylene glycol methylether acetate, ethylene glycol ethylether acetate, 4-hydroxy-4-methyl-2-pentanone, 2-hydroxy ethyl propionate, 2-hydroxy-2-methyl ethyl propionate, ethoxy ethyl acetate, hydroxy ethyl acetate, 2-hydroxy-3-methyl methyl butanoate, 3-methoxy methyl propionate, 3-methoxy ethyl propionate, 3-ethoxy ethyl propionate, 3-ethoxy methyl propionate, methyl methoxy butanol, ethyl methoxy butanol, methyl ethoxy butanol, ethyl ethoxy butanol, tetrahydrofuran, dichloromethane, 1,2-dichloroethane, 1,4-dichlorobutane, trichloroethane, chlorobenzene, o-dichlorobenzene, hexane, heptane, octane, benzene, toluene, xylene, and the like, and mixtures thereof.

The solvent amount in the liquid crystal alignment agent is not specifically limited, but the solid content in the liquid crystal alignment agent may range from about 1 to about 30 wt %, for example, from about 3 to about 20 wt %. In some embodiments, the solid content in the liquid crystal alignment agent may be in an amount of about 1, 2, 3, 4, 5, 6, 7, 8, 9, 10, 11, 12, 13, 14, 15, 16, 17, 18, 19, 20, 21, 22, 23, 24, 25, 26, 27, 28, 29, or 30 wt %. Further, according to some embodiments of the present invention, the solid content can be in a range from about any of the foregoing amounts to about any other of the foregoing amounts.

When the solid content is within the above range, the liquid crystal alignment agent may be less affected by an impurity on the substrate surface during printing and may maintain an appropriate viscosity. Thereby, this may prevent deterioration of the uniformity of a coating layer due to high viscosity and may provide an appropriate transmittance during the printing process.

The liquid crystal alignment agent may have a viscosity of about 3 cps to about 30 cps, for example about 3 cps to about 25 cps. When the liquid crystal alignment agent has a viscosity within the above range, it may improve the coating uniformity and coating property.

The liquid crystal alignment agent may further include one or more other additives.

The other additives may include an epoxy compound. The epoxy compound is used for improving the reliability and the electro-optical characteristics. The epoxy compound may include at least one kind of epoxy compound including 2 to 8 epoxy groups, for example, 2 to 4 epoxy groups.

The liquid crystal alignment agent may include the epoxy compound in an amount of about 0.1 parts by weight to about 50 parts by weight, for example about 1 to about 30 parts by weight, based on about 100 parts by weight of the polymer. When the epoxy compound is included in an amount within the above range, it may provide an appropriate printability and flatness during coating of a substrate and easily improve the reliability and the electro-optical characteristics.

Examples of the epoxy compound may include a compound represented by the following Chemical Formula 23, but is not limited thereto.

[Chemical Formula 23]

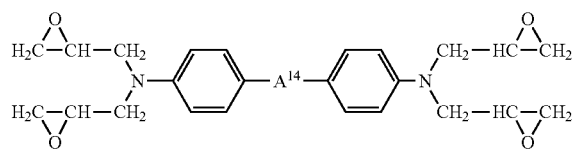

In Chemical Formula 23, $A^{14}$ is a substituted or unsubstituted C6 to C12 aromatic organic group, a substituted or unsubstituted divalent C6 to C12 alicyclic organic group, or a substituted or unsubstituted divalent C6 to C12 aliphatic organic group, for example a substituted or unsubstituted C1 to C6 alkylene group.

Examples of the epoxy compound may include without limitation N,N,N',N'-tetraglycidyl-4,4'-diaminophenylmethane (TGDDM), N,N,N',N'-tetraglycidyl-4,4'-diaminophenylethane, N,N,N',N'-tetraglycidyl-4,4'-diaminophenylpropane, N,N,N',N'-tetraglycidyl-4,4'-diaminophenylbutane, N,N,N',N'-tetraglycidyl-4,4'-diaminobenzene, ethyleneglycoldiglycidylether, polyethyleneglycoldiglycidylether, propyleneglycoldiglycidylether, tripropyleneglycoldiglycidylether, polypropyleneglycoldiglycidylether, neopentylglycoldiglycidylether, 1,6-hexanedioldiglycidylether, glycerinediglycidylether, 2,2-dibromoneopentylglycoldiglycidylether, 1,3,5,6-tetraglycidyl-2,4-hexanediol, N,N,N',N'-tetraglycidyl-1,4-phenylenediamine, N,N,N',N'-tetraglycidyl-m-xylenediamine, N,N,N',N'-tetraglycidyl-2,2'-dimethyl-4,4'-diaminobiphenyl, 2,2-bis[4-(N,N-diglycidyl-4-aminophenoxy)phenyl] propane, N,N,N',N'-tetraglycidyl-4,4'-diaminodiphenylmethane, 1,3-bis(N,N-diglycidylaminomethyl)cyclohexane, 1,3-bis(N,N-diglycidylaminomethyl)benzene, and the like, and combinations thereof.

In order to improve printability, the liquid crystal alignment agent may further include an additive such as an appropriate surfactant, a coupling agent, or a combination thereof.

The liquid crystal alignment film according to another embodiment is provided by using the liquid crystal alignment agent.

The liquid crystal alignment film may be obtained by applying the liquid crystal alignment agent on a substrate. The method of applying the liquid crystal alignment agent on the substrate may include spin coating, flexo printing, Inkjet printing and the like. The flexo printing may be generally used since it can provide excellent coating uniformity and easily covers a wide area.

The substrate is not specifically limited as long as it has high transmittance (is transparent). Examples of the substrate may include without limitation glass substrates and plastic substrates such as acrylic substrates, polycarbonate substrates, and the like. In addition, the substrate may include an indium-tin oxide (ITO) electrode or the like for driving the liquid crystal to simplify the manufacturing process.

The liquid crystal alignment agent can be uniformly coated on the substrate to increase the coating uniformity and pre-dried at a temperature ranging from room temperature to about 200° C., for example, about 30° C. to about 150° C., or about 40° C. to about 120° C. for about 1 minute to about 100 minutes. The pre-drying process may control the volatization of each component of the liquid crystal alignment agent to provide a uniform coating layer having minimal or no thickness deviation.

The coated substrate can then be baked at a temperature of about 80° C. to about 300° C., for example about 120° C. to about 280° C. for about 5 minutes to about 300 minutes to evaporate the solvent to provide a liquid crystal alignment film.

According to further another embodiment of the present invention, a liquid crystal display is provided that includes the liquid crystal alignment film.

The following examples illustrate this disclosure in more detail. However, the examples are exemplary embodiments of the invention and are not limiting.

EXAMPLE

Comparative Example 1

Preparation of Polyamic Acid 0.5 mol of (E)-4-(3-(2,4-diaminophenethoxy)-3-oxoprophenyl)phenyl 4-(4,4,4-trifluorobutoxy)benzorate represented by the following Chemical Formula 1a and N-methyl-2-pyrrolidone (NMP) are introduced into a 4-necked flask including an agitator, a temperature controlling device, a nitrogen gas injection tube, and a cooler under the dark room condition with passing nitrogen to provide a mixed solution. 1.0 mol of solid 4,10-dioxa-tricyclo[6.3.1.0$^{2,7]dodecane}$-3,5,9,11-tetraone is added to the mixed solution and vigorously agitated. Then 0.5 mol of (E)-4-(3-(2,4-diaminophenethoxy)-3-oxoprophenyl)phenyl 4-(4,4,4-trifluorobutoxy)benzorate represented by Chemical Formula 1a is added thereto and reacted while maintaining the temperature at 30° C. to 60° C. for 24 hours to provide a liquid crystal alignment agent including polyamic acid (PAA-39). The provided liquid crystal alignment agent had a solid content of 30 wt % and a viscosity of 209 cps.

Comparative Example 2

Preparation of Polyimide 3.0 mol of acetic anhydride and 5.0 mol of pyridine are added into the obtained polyamic acid solution and cyclized at 80° C. for 6 hours. Then the catalyst and the solvent are removed by vacuum distillation to provide a polyimide resin.

The organic solvent of N-methyl-2-pyrrolidone (NMP) or γ-butyrolactone is added into the obtained the polyimide resin and agitated at room temperature for 24 hours to provide a liquid crystal alignment agent. The obtained liquid crystal alignment agent has a solid content of 15 wt % and a viscosity of 27 cps.

Example 1

Preparation of Polyamic Acid (PSA-1)

1.0 mol of 4-(1E,3E)-5-(2,4-diaminophenethoxy)-5-oxopenta-1,3-dienyl)phenyl 4-(4,4,4-trifluorobutoxy)benzorate represented by Chemical Formula 3a is introduced into a 4-necked flask including an agitator, a temperature controlling device, a nitrogen gas injection tube, and a cooler under the dark room condition with passing nitrogen, and N-methyl-2-pyrrolidone (NMP) is added into the flask to dissolve the compound represented by Chemical Formula 3a into NMP.

1.0 mol of solid 4,10-dioxa-tricyclo[6.3.1.0$^{2,7}$]dodecane-3,5,9,11-tetraone (also referred to "2,3,5-tricarboxylcyclopentyl acetic anhydride") is added into the solution and agitated for 1 hour and reacted to provide an appropriate viscosity (about 150 cps).

The obtained solution has a solid content of 30 wt %. It is copolymerized while maintaining a temperature of 50° C. for 24 hours to provide a polyamic acid solution.

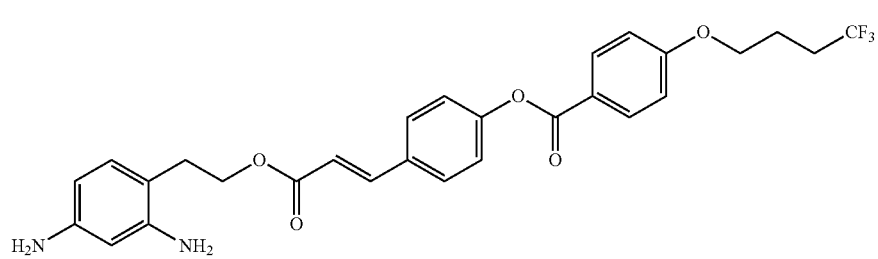

[Chemical Formula 1a]

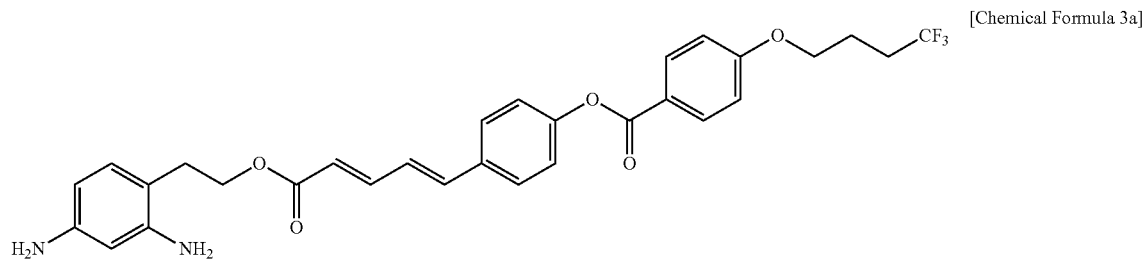 [SMILES: Nc1ccc(CCOC(=O)/C=C/C=C/c2ccc(OC(=O)c3ccc(OCCCC(F)(F)F)cc3)cc2)c(N)c1]

[Chemical Formula 3a]

The obtained polyamic acid solution is distillated to provide a pure polyamic acid. The obtained polyamic acid has a weight average molecular weight of 200,000. An organic mixed solvent (volume ratio of 3:4:3) of N-methyl-2-pyrrolidone (NMP), γ-butyrolactone, and 2-butylcellosolve is added into the polyamic acid and agitated at a room temperature for 24 hours to provide a photo alignment polyamic acid (PSA-1) solution which is a liquid crystal alignment agent.

Examples 2 and 3

Preparation of polyamic acid (PSA-2 to 3)

A photo alignment polyamic acid (PSA-2 to 3, liquid crystal alignment agent) solution is prepared in accordance with the same procedure as in Example 1, except that 4-(1E,3E)-5-(2,4-diaminophenethoxy)-5-oxopenta-1,3-dienyl)phenyl 4-(4,4,4-trifluorobutoxy)benzorate represented by Chemical Formula 3a and 4,4'-(1E,1'E)-3,3'-(2,2-bis(4-aminobenzyl)propan-1,3-diyl)bis(oxy)bis(3-oxopropen-3,1-diyl)bis(4,1-phenylene)bis(4-(4,4,4-trifluorobutoxy)benzorate represented by Chemical Formula 4a are included as in the following Table 1.

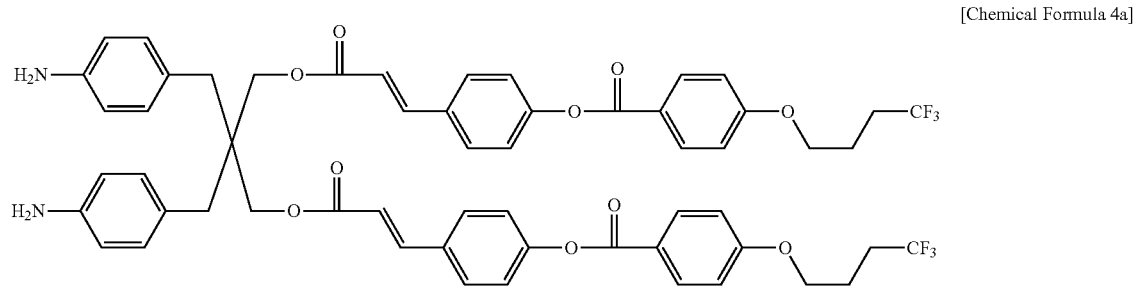 [SMILES: Nc1ccc(CC(COC(=O)/C=C/c2ccc(OC(=O)c3ccc(OCCCC(F)(F)F)cc3)cc2)(COC(=O)/C=C/c2ccc(OC(=O)c3ccc(OCCCC(F)(F)F)cc3)cc2)Cc2ccc(N)cc2)cc1]

[Chemical Formula 4a]

Examples 4 to 6

Preparation of Polyamic Acid (PSA-4 to 6)

A photo alignment polyamic acid (PSA-4 to 6, liquid crystal alignment agent) solution is prepared in accordance with the same procedure as in Example 1, except that 4-(1E,3E)-5-(2,4-diaminophenethoxy)-5-oxopenta-1,3-dienyl)phenyl 4-(4,4,4-trifluorobutoxy)benzorate represented by Chemical Formula 3a, 4,4'-(1E,1'E)-3,3'-(2,2-bis(4-aminobenzyl)propan-1,3-diyl)bis(oxy)bis(3-oxopropen-3,1-diyl)bis(4,1-phenylene)bis(4-(4,4,4-trifluorobutoxy)benzorate represented by Chemical Formula 4a, and 1-(3,5-diaminophenyl)-3-octadecyl pyrrolidine-2,5-dione represented by Chemical Formula 5a are included as in the following Table 1.

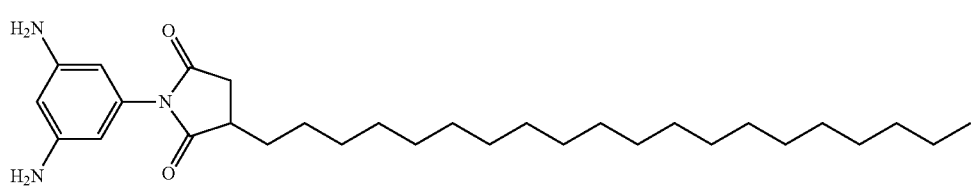

[Chemical Formula 5a]

Example 7

Preparation of Polyimide Polymer (PSI-1)

0.5 mol of 4-(1E,3E)-5-(2,4-diaminopenethoxy)-5-oxopenta-1,3-dienyl)phenyl 4-(4,4,4-trifluorobutoxy)benzorate represented by Chemical Formula 3a is introduced into a 4-necked flask including an agitator, a temperature controlling device, a nitrogen gas injection tube, and a cooler under dark room conditions while passing nitrogen, and N-methyl-2-pyrrolidone (NMP) is added into the flask to dissolve the compound represented by Chemical Formula 3a into NMP.

1.0 mol of solid 4,10-dioxa-tricyclo[6.3.1.0$^{2,7}$]dodecane-3,5,9,11-tetraone (also referred to "2,3,5-tricarboxylcyclopentyl acetic anhydride") is added into the solution and vigorously agitated.

After agitating for one hour, the mixture is reacted to provide an appropriate viscosity (about 150 cps).

The obtained solution has a solid content of 30 wt %, and the obtained solution is reacted at room temperature for 24 hours to provide a polyamic acid solution.

3.0 mol of acetic anhydride catalyst and 5.0 mol of pyridine catalyst are added into the polyamic acid solution and heated to 80° C. and reacted for 6 hours. The acetic anhydride and the pyridine catalyst and NMP solvent are removed by vacuum distillating the reaction products to provide a soluble polyimide resin solution having a solid content of 20 wt %.

The obtained soluble polyimide resin is distillated to provide a pure soluble polyimide resin (weight average molecular weight of 200,000). An organic mixed solvent (volume ratio of 3:4:3) of N-methyl-2-pyrrolidone (NMP), γ-butyrolactone, and 2-butylcellosolve is added into the obtained soluble polyamide resin and agitated at room temperature for 24 hours to provide a photo alignment polyimide resin(PSI-1) which is a liquid crystal alignment agent.

Examples 8 to 9

Preparation of Polyimide Polymer (PSI-2 to PSI-3)

Examples 8 and 9 are performed in accordance with the same procedure as in Example 7, except that 4-(1E,3E)-5-(2,4-diaminophenethoxy)-5-oxopenta-1,3-dienyl)phenyl 4-(4,4,4-trifluorobutoxy)benzorate represented by Chemical Formula 3a and 4,4'-(1E,1'E)-3,3'-(2,2-bis(4-aminobenzyl) propan-1,3-diyl)bis(oxy)bis(3-oxopropen-3,1-diyl)bis(4,1-phenylene)bis(4-(4,4,4-trifluorobutoxy)benzorate represented by Chemical Formula 4a are included in amounts as indicated in the following Table 1 to provide a polyamic acid, and then a soluble photo alignment polyimide resin solution (liquid crystal alignment agent) is obtained using the polyamic acid in accordance with the same procedure as in Example 7.

Examples 10 to 12

Preparation of Polyimide Polymer (PSI-4 to PSI-6)

Examples 10 to 12 are performed in accordance with the same procedure as in Example 7, except that 4-(1E,3E)-5-(2,4-diaminophenethoxy)-5-oxopenta-1,3-dienyl)phenyl 4-(4,4,4-trifluorobutoxy)benzorate represented by Chemical Formula 3a, 4,4'-(1E,1'E)-3,3'-(2,2-bis(4-aminobenzyppropan-1,3-diyl)bis(oxy)bis(3-oxopropen-3,1-diyl)bis(4,1-phenylene)bis(4-(4,4,4-trifluorobutoxy)benzorate represented by Chemical Formula 4a, and 1-(3,5-diaminophenyl)-3-octadecylpyrrolidine-2,5-dione represented by Chemical Formula 5a are included in amounts as indicated in the following Table 1 to provide a polyamic acid, and then a soluble photo alignment polyimide resin solution (liquid crystal alignment agent) is obtained using the polyamic acid in accordance with the same procedure as in Example 7.

TABLE 1

| | Preparation Example | Chemical Formula 3a (mol %) | Chemical Formula 4a (mol %) | Chemical Formula 5a (mol %) | Type |
|---|---|---|---|---|---|
| Example 1 | PSA-1 | 100 | — | — | polyamic acid |
| Example 2 | PSA-2 | 90 | 10 | — | polyamic acid |
| Example 3 | PSA-3 | 80 | 20 | — | polyamic acid |
| Example 4 | PSA-4 | 70 | 10 | 20 | polyamic acid |
| Example 5 | PSA-5 | 60 | 10 | 30 | polyamic acid |
| Example 6 | PSA-6 | 50 | 10 | 40 | polyamic acid |
| Example 7 | PSI-1 | 100 | — | — | polyimide |
| Example 8 | PSI-2 | 90 | 10 | — | polyimide |
| Example 9 | PSI-3 | 80 | 20 | — | polyimide |
| Example 10 | PSI-4 | 70 | 10 | 20 | polyimide |
| Example 11 | PSI-5 | 60 | 10 | 30 | polyimide |
| Example 12 | PSI-6 | 50 | 10 | 40 | polyimide |

As shown in Table 1, the amount unit of Chemical Formula 3a, Chemical Formula 4a and Chemical Formula 5a is mol %, which is mol % of each used component based on the total mol of diamine used for preparing polyamic acid.

Experimental Example 1

Assessment of Vertical Alignment Properties of Liquid Crystal Alignment Film (Measuring the Pretilt Angle Difference (ΔPretilt) from the Standard Liquid Crystal Cell)

A liquid crystal cell is used to evaluate vertical alignment properties of liquid crystal alignment agents. The liquid crystal cell is fabricated as follows.

Photolithography for patterning is performed to remove the rest of indium-tin oxide (ITO) except for a 3 cm×6 cm square-shaped ITO and an ITO electrode shape for voltage application on a standardized ITO glass substrate.

The liquid crystal photo-alignment agents of Examples 1 to 12 and Comparative Examples 1 to 3 are spin-coated to a thickness of 0.1 μm on the patterned ITO substrate and cured at a temperature of 80° C. and 220° C.

In order to measure the vertical alignment properties, a test liquid crystal cell is manufactured through a rubbing process, an assembling process, and an liquid crystal injecting process.

The vertical alignment property of liquid crystal cell obtained from the processes is observed using a perpendicularly polarized optical microscope. After observing the vertical alignment properties, the liquid crystal cell having good vertical alignment properties is selected for a standard liquid crystal cell, and the pretilt angle of the standard liquid crystal cell is designated as 90°. Then each liquid crystal cell is irradiated with UV energy while applying an electric field and measured for the pretilt angle using a crystal rotation method. In Table 1, Δpretilt indicates the difference between the measured pretilt angle of each liquid crystal cell and the pretilt angle of the standard liquid crystal cell.

The references for evaluating the vertical alignment properties are as follows:

<Reference for Evaluating Vertical Alignment Properties>

Good: the pretilt angle difference from the standard liquid crystal cell ranges from 0.3° to 4°.

Bad: the pretilt angle difference from the standard liquid crystal cell is less than 0.3° or more than 4°.

Experimental Example 2

Liquid Crystal Alignment Properties

The obtained liquid crystal cell is irradiated with UV energy while applying electrical field, and the liquid crystal alignment properties of each liquid crystal cell is measured by using a perpendicularly polarized optical microscope. The references for evaluating the liquid crystal alignment properties are follows:

<Reference for Evaluating Liquid Crystal Alignment Properties>
Good: finding no disclination
Bad: finding disclination Experimental Example 3

Voltage Holding Ratio and Residual DC Voltage

A voltage of 1V is applied to the obtained liquid crystal cell, and the voltage holding ratio (VHR) at room temperature of each liquid crystal cell is measured; and a voltage of 0V to +10V is applied to the obtained liquid crystal cell, and the residual DC (RDC) voltage of each liquid crystal cell is measured.

The voltage holding ratio indicates the degree that the charged voltage is maintained by the liquid crystal layer floated with extraneous power for a random period in active matrix mode TFT-LCD, which is preferable to approach 100%.

<Reference of Evaluating Voltage Holding Ratio>
Good: 97% or higher
Bad: less than 97%

The residual DC voltage indicates voltage applied to the liquid crystal layer by adsorbing impurities of ionized liquid crystal layer to the alignment layer, in which the lower is the better. The method of measuring the residual DC voltage generally includes a method using a flicker, a method of using electrical capacity change curved line (C-V) of liquid crystal layer depending upon DC voltage.

<Reference of Evaluating Residual DC Voltage>
Good: less than 100 mV
Bad: 100 mV or higher

TABLE 2

| Preparation Example | Vertical alignment | Liquid crystal alignment properties | Voltage holding ratio | RDC |
|---|---|---|---|---|
| PSA-1 | Good | Good | Good | Good |
| PSA-2 | Good | Good | Good | Good |
| PSA-3 | Good | Good | Good | Good |
| PSA-4 | Good | Good | Good | Good |
| PSA-5 | Good | Good | Good | Good |
| PSA-6 | Good | Good | Good | Good |
| PSI-7 | Good | Good | Good | Good |
| PSI-8 | Good | Good | Good | Good |
| PSI-9 | Good | Good | Good | Good |
| PSI-10 | Good | Good | Good | Good |
| PSI-11 | Good | Good | Good | Good |
| PSI-12 | Good | Good | Good | Good |
| Comparative Example 1 | Good | Good | Good | Bad |
| Comparative Example 2 | Good | Good | Good | Bad |

As shown in Table 2, the liquid crystal alignment agents obtained from Examples 1 to 12 have improved RDC characteristics compared to Comparative Examples 1 and 2.

The term RDC characteristics refers to the references for evaluating the electric characteristics of liquid crystal alignment film. A higher value means that the liquid crystal is more polluted due to organic or inorganic materials which can deteriorate long-term reliability. Accordingly, the liquid crystal alignment agents obtained from Examples 1 to 12 have more excellent electric characteristics than those of Comparative Examples 1 and 2.

Many modifications and other embodiments of the invention will come to mind to one skilled in the art to which this invention pertains having the benefit of the teachings presented in the foregoing descriptions. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation, the scope of the invention being defined in the claims.

What is claimed is:

1. A liquid crystal alignment agent comprising
a polyamic acid including a repeating unit represented by the following Chemical Formula 1, a polyimide including a repeating unit represented by the following Chemical Formula 2, or a combination thereof:

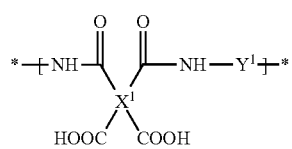

[Chemical Formula 1]

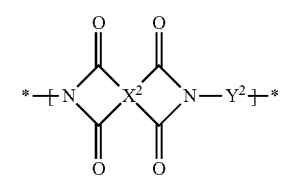

[Chemical Formula 2]

wherein, in Chemical Formulae 1 and 2,
$X^1$ and $X^2$ are the same or different and are each independently a tetravalent organic group derived from alicyclic acid dianhydride or aromatic acid dianhydride, and
$Y^1$ and $Y^2$ are the same or different and are each independently a divalent organic group derived from diamine, wherein the diamine includes a diamine represented by the following Chemical Formula 3,

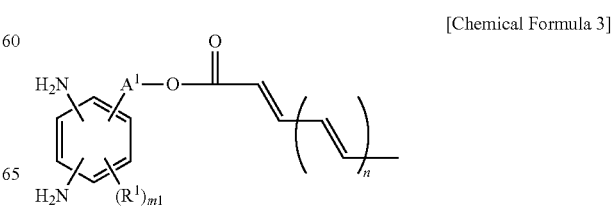

[Chemical Formula 3]

-continued

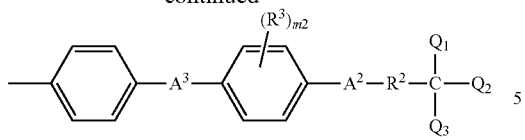

wherein, in Chemical Formula 3, $A^1$ is substituted or unsubstituted C1 to C20 alkylene, $A^2$ is a single bond, O, $SO_2$, or $C(R_{103})(R_{104})$, wherein $R_{103}$ and $R_{104}$ are the same or different and are independently hydrogen or substituted or unsubstituted C1 to C6 alkylene, $A^3$ is —O—, —OCO—, —COO—, —CONH—, or —NHCO—, each $R^1$ is the same or different and is independently substituted or unsubstituted C1 to C30 alkyl; substituted or unsubstituted C6 to C30 aryl; or substituted or unsubstituted C2 to C30 heteroaryl, $R^2$ is substituted or unsubstituted Cl to C30 alkylene, Cl to C30 alkylene wherein at least one —$CH_2$— group thereof is replaced with —CO—, —CO—O—, —NZ—, —NZ—CO—, —CO—NZ— or —CH=CH—, wherein Z is hydrogen or C1 to C10 alkyl, provided that oxygen atoms are not directly bound to each other, each $R^3$ is the same or different and is independently substituted or unsubstituted C1 to C30 alkyl; substituted or unsubstituted C6 to C30 aryl; or substituted or unsubstituted C2 to C30 heteroaryl, $Q_1$, $Q_2$ and $Q_3$ are the same or different and are independently hydrogen or halogen, n is an integer ranging from 1 to 3, m1 is an integer ranging from 0 to 3, and m2 is an integer ranging from 0 to 4, wherein the term substituted means that each group is substituted with a substituent comprising halogen, hydroxy, nitro, cyano, $NH_2$, $NH(R^{100})$, $N(R^{101})(R^{102})$, amidino, hydrazine, hydrazone, carboxyl, alkyl, haloalkyl, alkoxy, alicyclic, aryl, alkenyl, alkynyl, heteroaryl, heterocycloalkyl, or a combination thereof, wherein $R^{100}$, $R^{101}$, and $R^{102}$ are the same or different and are each independently C1 to C10 alkyl.

2. The liquid crystal alignment agent of claim 1, wherein the diamine further comprises a diamine represented by the following Chemical Formula 4, a diamine represented by the following Chemical Formula 5, or a combination thereof:

wherein, in Chemical Formula 4, each $R^4$ is the same or different and is independently substituted or unsubstituted C1 to C30 alkylene, C1 to C30 alkylene wherein at least one —$CH_2$— group thereof is replaced with —CO—, —CO—O—, —NZ—, —NZ—CO—, —CO—NZ— or —CH=CH—, wherein Z is hydrogen or C1-C10 alkyl, provided that oxygen atoms are not directly bound to each other, and $Q^4$, $Q^5$, $Q^6$, $Q^7$, $Q^8$ and $Q^9$ are the same or different and are independently hydrogen or halogen,

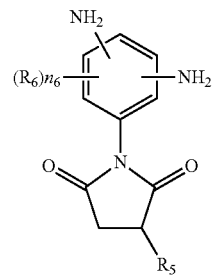

[Chemical Formula 5]

wherein, in Chemical Formula 5, $R_5$ is hydrogen; substituted or unsubstituted C1 to C30 alkyl; substituted or unsubstituted C6 to C30 aryl; or substituted or unsubstituted C2 to C30 heteroaryl, each $R_6$ is the same or different and is independently substituted or unsubstituted C1 to C30 alkyl; substituted or unsubstituted C6 to C30 aryl; or substituted or unsubstituted C2 to C30 heteroaryl, and n6 is an integer ranging from 0 to 3, wherein the term substituted has the same meaning as in claim 1.

3. The liquid crystal alignment agent of claim 2, wherein the diamine comprises about 30mol % to about 90mol % of the diamine represented by Chemical Formula 3, about 5mol % to about 20mol % of the diamine represented by Chemical Formula 4, and about 5mol % to about 50mol % of the diamine represented by Chemical Formula 5, based on the total amount of diamine.

4. The liquid crystal alignment agent of claim 1, wherein the diamine represented by Chemical Formula 3 is a diamine represented by the following Chemical Formula 6:

[Chemical Formula 4]

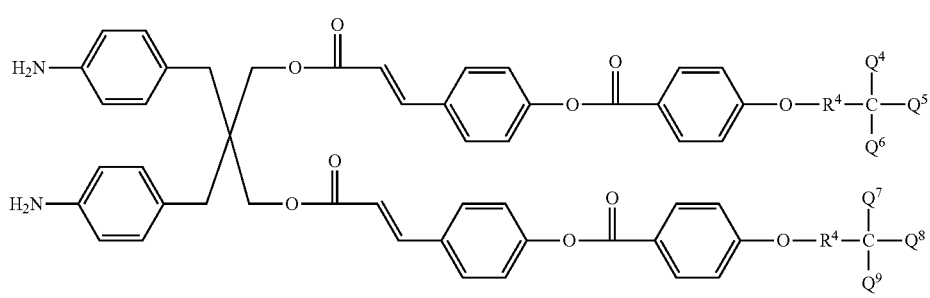

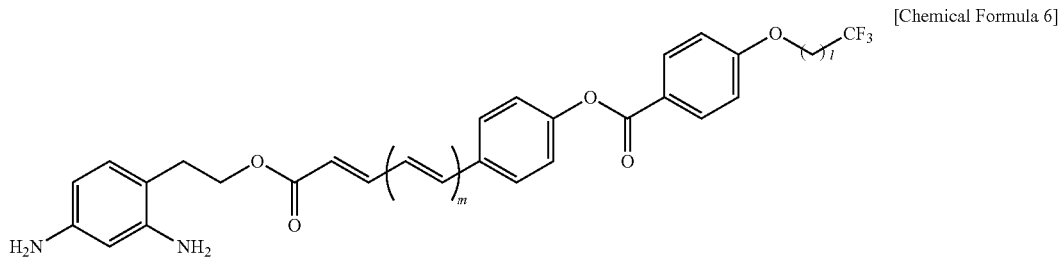

wherein, in Chemical Formula 6, l is an integer ranging from 1 to 10, and m is an integer ranging from 0 to 3.

5. The liquid crystal alignment agent of claim 1, wherein the polyamic acid and the polyimide each have a weight average molecular weight of about 10,000 to about 300,000.

6. The liquid crystal alignment agent of claim 1, wherein the liquid crystal alignment agent comprises the polyamic acid and the polyimide at a weight ratio of about 1:99 to about 50:50.

7. The liquid crystal alignment agent of claim 1, wherein the liquid crystal alignment agent comprises about 1 wt % to about 30 wt % of a solid.

8. The liquid crystal alignment agent of claim 1, wherein the liquid crystal alignment agent has a viscosity of about 3 cps to about 30 cps.

9. A liquid crystal alignment film manufactured by applying the liquid crystal alignment agent of claim 1 to a substrate.

10. A liquid crystal display including the liquid crystal alignment film of claim 9.

* * * * *

UNITED STATES PATENT AND TRADEMARK OFFICE
CERTIFICATE OF CORRECTION

PATENT NO.        : 8,623,515 B2
APPLICATION NO.   : 13/238569
DATED             : January 7, 2014
INVENTOR(S)       : Jae-Deuk Yang et al.

It is certified that error appears in the above-identified patent and that said Letters Patent is hereby corrected as shown below:

In the Specification:

Column 8, Line 44 reads: "$A^3$ is -O-, -COO-, -COO-, -CONH-, or"
and should read: "$A^3$ is -O-, -OCO-, -COO-, -CONH-, or"

Signed and Sealed this
Seventeenth Day of June, 2014

Michelle K. Lee
*Deputy Director of the United States Patent and Trademark Office*